United States Patent
King

(10) Patent No.: US 6,635,218 B2
(45) Date of Patent: Oct. 21, 2003

(54) CONTINUOUS PRODUCTION OF PLASTIC SIDING PANELS WITH SEPARATE SHINGLE APPEARANCE

(76) Inventor: Daniel W. King, 841 Bath Country Dr., Akron, OH (US) 44333

( * ) Notice: Subject to any disclaimer, the term of this patent is extended or adjusted under 35 U.S.C. 154(b) by 0 days.

(21) Appl. No.: 09/919,136

(22) Filed: Jul. 31, 2001

(65) Prior Publication Data

US 2001/0039778 A1 Nov. 15, 2001

Related U.S. Application Data

(63) Continuation-in-part of application No. 09/315,317, filed on May 20, 1999, now abandoned.
(60) Provisional application No. 60/086,378, filed on May 22, 1998.

(51) Int. Cl.[7] .......................... B29C 51/34; B29C 51/10
(52) U.S. Cl. ........................ 264/536; 264/555; 264/160
(58) Field of Search .................. 264/536, 555, 264/211.15, 211.18, 156, 161, 160; 425/388, 387.1

(56) References Cited

U.S. PATENT DOCUMENTS

| | | | | |
|---|---|---|---|---|
| 3,281,516 A | | 10/1966 | Southwick | |
| 3,540,079 A | * | 11/1970 | Bush | |
| 3,593,479 A | | 7/1971 | Hinds et al. | |
| 3,982,868 A | | 9/1976 | Rinker | |
| 4,061,706 A | | 12/1977 | Duffield et al. | |
| 4,128,369 A | * | 12/1978 | Kemerer et al. | |
| 4,649,008 A | | 3/1987 | Johnstone et al. | |
| 5,314,325 A | | 5/1994 | Bosler | |
| 5,455,099 A | | 10/1995 | Banner | |
| 6,161,354 A | | 12/2000 | Gilbert et al. | |

* cited by examiner

*Primary Examiner*—Mark Eashoo
(74) *Attorney, Agent, or Firm*—Jacox, Meckstroth & Jenkins

(57) ABSTRACT

A sheet of plastics material is continuously extruded onto the upper run of an endless conveyor which carries aluminum vacuum mold plates each defining a cavity with a shingle pattern. The sheet is progressively vacuum-formed into the mold plate cavities, and opposite longitudinal upper and lower portions of the sheet are progressively vacuum-formed, with traveling plug assist in one embodiment, to define shingle panels with hook-shaped lower portions and upper portions defining grooves for receiving the lower portions. The upper portion of the sheet is punched with longitudinally spaced slots to form a nailing flange, and the sheet is then cut laterally at longitudinally spaced intervals to produce elongated siding panels each having integrally connected shingle panels. The shingle panels may have different bottom configurations or profiles and are interchangeable.

9 Claims, 5 Drawing Sheets

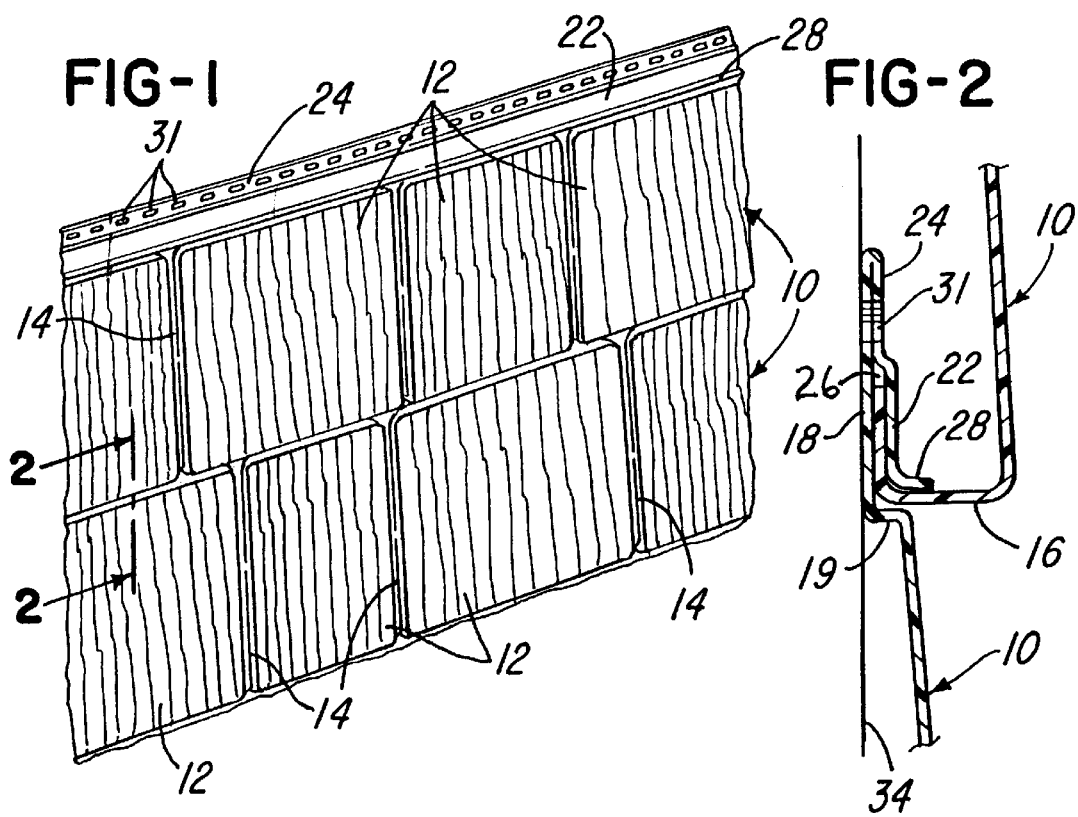
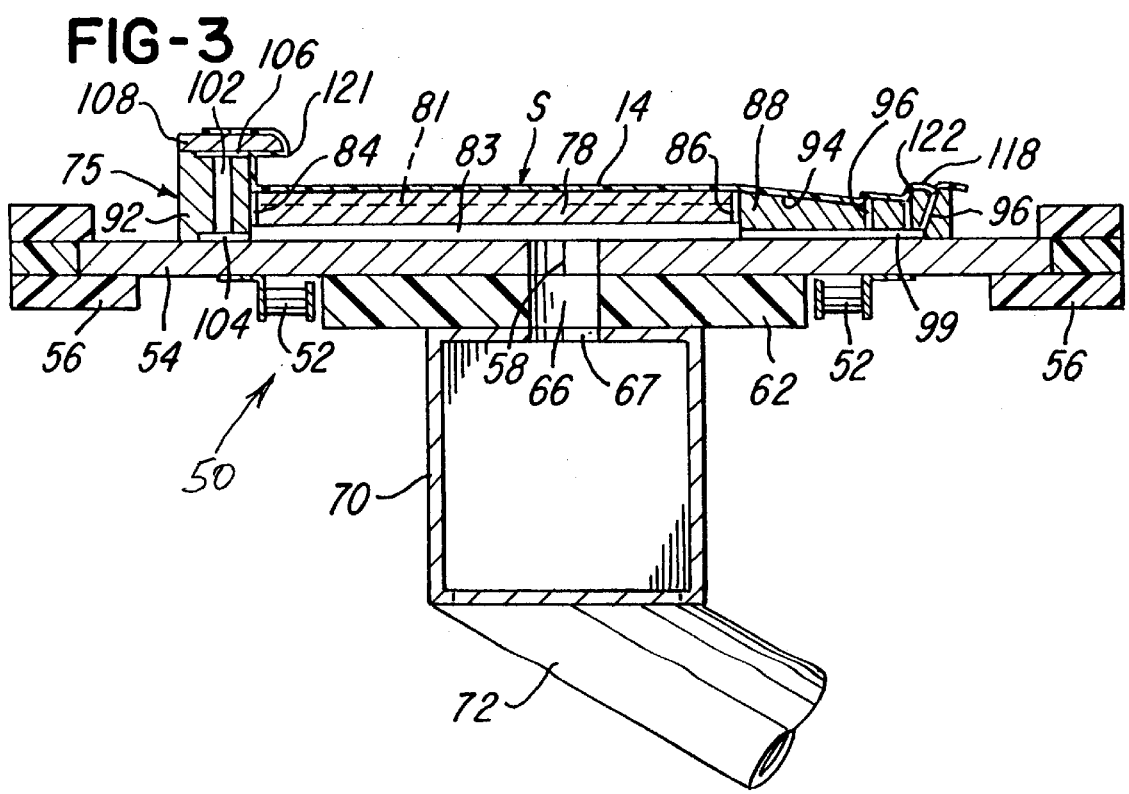

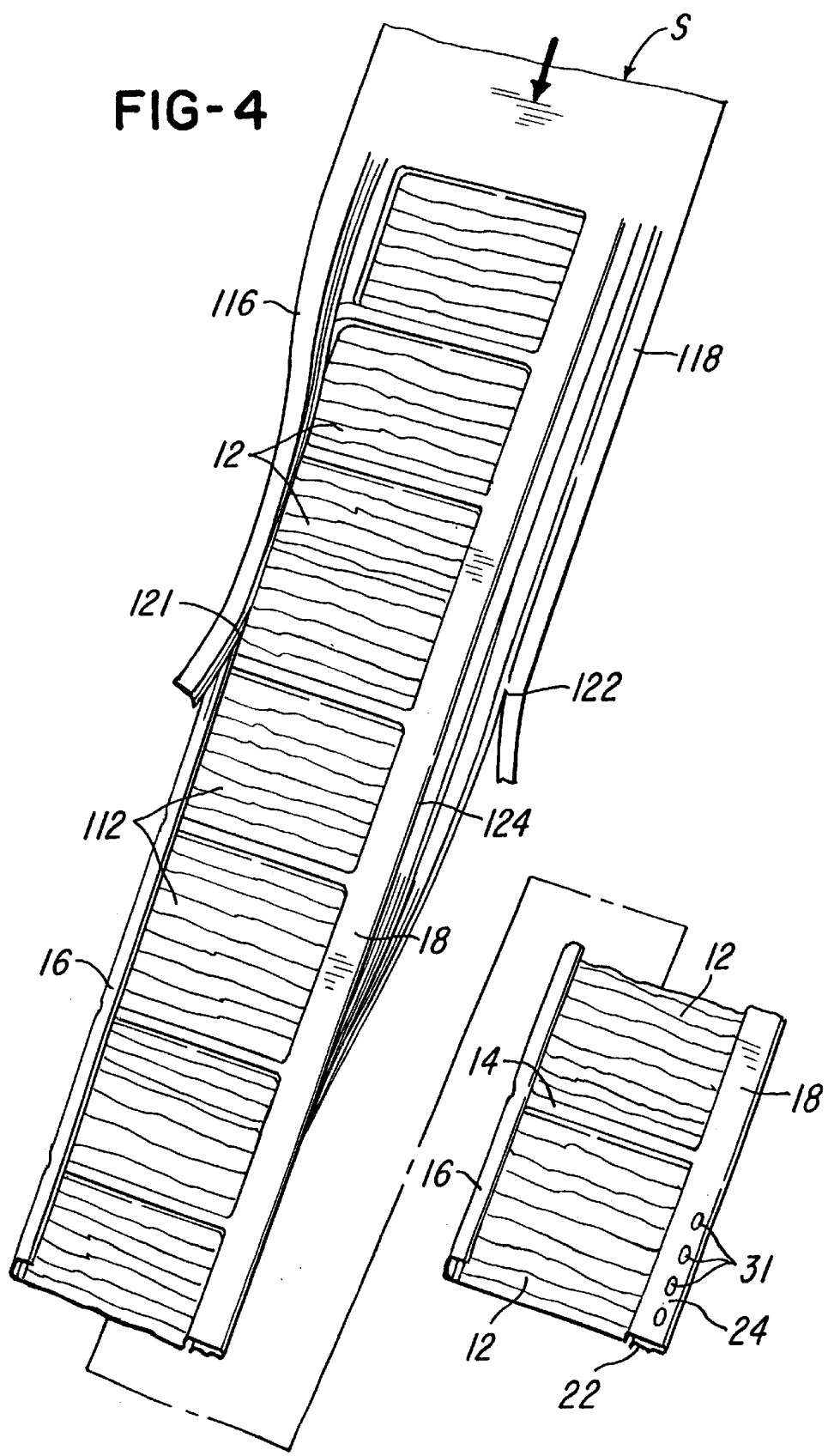

CONTINUOUS PRODUCTION OF PLASTIC SIDING PANELS WITH SEPARATE SHINGLE APPEARANCE

RELATED APPLICATIONS

This application is a continuation-in-part of application Ser. No. 09/315,317, filed May 20, 1999, now abandoned, and claims the benefit of the filing date of May 22, 1998 of provisional application Ser. No. 60/086,378.

BACKGROUND OF THE INVENTION

In the production of vinyl siding panels having the appearance of rough-sawn cedar shake shingles, for example, as disclosed in U.S. Pat. Nos. 3,593,479 and 5,455,099, it is known to injection mold the panel or vacuum-form a precut sheet and then trim and punch and form the edge portions of the sheet, to form a hook-shaped lower portion along the panel and an upper portion which defines a groove and forms a nailing flange. It is also known to extrude or form a flat sheet of plastics material and then direct the sheet onto the upper run of an endless flexible belt conveyor for vacuum-forming the sheet, for example, as disclosed in U.S. Pat. Nos. 3,982,868 and 5,314,325. The endless flexible belt is constructed of a porous material and defines cavities into which the hot plastic sheet is sucked by a vacuum source under the upper run of the endless belt. The door sheet is then cooled and cut at longitudinally spaced intervals to produced vacuum-formed garage door panels or other articles. It has been found that the endless flexible conveyor belts for producing vacuum-formed articles are expensive to construct, have a relatively short service life and do not conduct heat rapidly away from the vacuum-form sheet.

SUMMARY OF THE INVENTION

The present invention is directed to an improved method and apparatus for continuously producing elongated plastic siding panels each having a series of separate shingle panels, and which apparatus is simple and dependable in operation and provides for an extended service life for producing a high volume of siding panels. In accordance with a preferred embodiment of the invention, a flat sheet of plastics material or polyvinylchloride is extruded with a substantially uniform thickness and is directed onto the upper run of an endless vacuum-forming conveyor. The conveyor includes a pair of endless flexible chains which are directed around end sprockets and carry an endless and continuous series of aluminum carrier slats. Each of the carrier slats has a center hole for receiving a vacuum from a manifold under the upper run and supports a corresponding shingle mold plate also constructed of aluminum. Each mold plate defines a cavity having a textured surface for the corresponding shingle and has opposite end portions with suction passages for progressively vacuum-forming the opposite upper and lower longitudinal portions of the sheet to define panels with hook-shaped lower portions and upper portions defining grooves for receiving the lower portions. As the conveyor continues to move, the vacuum-formed sheet is cooled, and edge portions of the sheet are trimmed.

In one embodiment, the upper portion of the sheet is reheated as the sheet separates from the mold plates on the endless conveyor, and the upper portion is folded back on itself to form a double wall nailing flange and a groove for receiving the hook-shaped lower portion of an adjacent overlapping siding panel. In another embodiment, reciprocating plugs assist in forming the hook-shaped lower portions and projections with undercut grooves within the upper portions adjacent a continuous nailing flange. The nailing flange is punched with longitudinally spaced slots, and the continuously moving sheet is then cut transversely at longitudinally spaced intervals to form a succession of elongated siding panels each having a length of about five feet.

Other features and advantages of the invention will be apparent from the following description, the accompanying drawings and the appended claims.

BRIEF DESCRIPTION OF THE DRAWINGS

FIG. 1 is a fragmentary perspective view of two overlapping siding panels produced in accordance with one embodiment of the invention;

FIG. 2 is a fragmentary section taken generally on the line 2—2 of FIG. 1;

FIG. 3 is a vertical section through the upper run of an endless vacuum-forming conveyor constructed in accordance with the invention;

FIG. 4 is a perspective view of a plastic sheet being vacuum-formed in accordance with one embodiment of the invention and illustrating the progressive steps for successively producing the panels;

DESCRIPTION OF THE PREFERRED EMBODIMENTS

Figure 5:
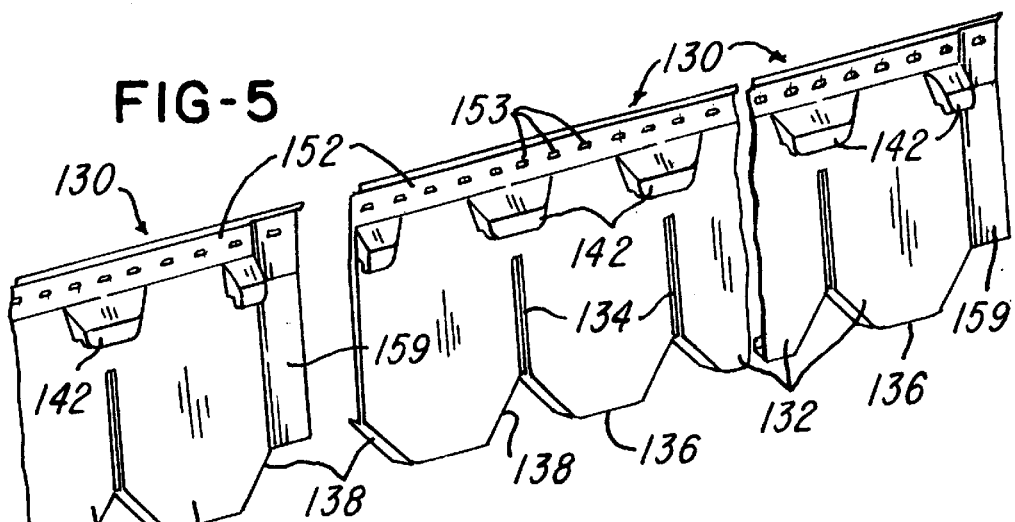
FIG. 5 is a fragmentary perspective view of portions of two siding panels constructed in accordance with another embodiment of the invention.

FIG. 1 illustrates portions of two elongated siding panels 10 connected together as shown in FIG. 2, and each siding panel has a length of about five feet. Each siding panel is formed from a sheet of rigid plastics material such as polyvinylchloride or "vinyl" and includes a series of ten generally rectangular shingle panels 12 each having a different and distinct wood grain appearance. The shingle panels 12 are integrally connected by flat recessed strip portions 14 defining grooves, and each panel 10 has a longitudinally extending hook-shaped lower portion 16 (FIG. 2). Each panel 10 also has a longitudinally extending upper flange portion 18 which extends from a step or shoulder portion 19 and is integrally connected to a folded-over flange portion 22.

The folded-over flange portion 22 cooperates with the flange portion 18 to form a double wall nailing flange 24 and a slot or groove 26 for receiving and retaining the hook-shaped lower edge portion 16 of the above overlapping panel 10. The folded-over flange portion 22 has a bottom lip 28 which is spaced above the shoulder portion 19 to facilitate inserting the hook-shaped lower edge portion 16 into the groove 26. As also shown in FIGS. 1 and 2, the upper nailing flange 24 of each panel 10 has a series of longitudinally spaced slots 31 for receiving longitudinally spaced nails which attach the panel 10 to a vertical wall surface 34.

Referring to FIGS. 3 and 4, the siding panels 10 are continuously produced from a flat sheet S of plastics material or polyvinylchloride which has a substantially uniform thickness and which is produced by a flat sheet die on a plastics extruder (not shown), as well known in the art. The hot vinyl sheet S from the extruder is directed onto the top or upper run of an endless vacuum-forming machine or conveyor 50 (FIG. 3). The conveyor includes a pair of endless flexible length chains 52 which carry a continuous series of separate aluminum carrier plates or slats 54, with one carrier slat corresponding to one of the shingle panels 12. The opposite end portions of each carrier slat 54 are guided along the upper run of the endless conveyor by a pair of opposing guide tracks or rails 56 each constructed of a set of strips of solid low friction plastics materials.

Each of the rectangular carrier slats 54 has a center hole 58, and the slats are supported for horizontal sliding movement along a set of stationary elongated support plates 62 each constructed of a low friction solid plastics material. As the continuous series of carrier slats 54 move along the top surface of the support plates 62, the holes 58 align with longitudinally extending slots 66 within the support plates 62. The slots 66 connect with corresponding slots 67 within the top wall of a longitudinally extending suction or vacuum manifold 70 connected by longitudinally spaced tube 72 to a vacuum source or pump.

Each of the carrier slats 54 has a width equal to the width of the corresponding shingle panel 12 plus one of the separator strip portions 14. A shingle mold plate 75 has the same width as its corresponding carrier slat 54 and is secured to its carrier slat 54 by a set of screws (not shown) extending through the slat 54 and threaded into the mold plate 75. Each mold plate 75 includes a rectangular intermediate section 78 defining a recessed cavity 81 having a wood grain surface texture corresponding to the desired wood grain appearance on the corresponding shingle 12. The intermediate section 78 of each mold plate 75 has a bottom vacuum cavity 83 which connects the center vacuum hole or passage 58 to narrow vacuum slots 84 and 86 at opposite ends of the mold section 78 and to a top mold section 88 and a bottom mold section 92. The top mold section 88 has a stepped top surface 94 and three rows of small holes or passages 96 which extend from steps in the top surface to a vacuum cavity or passage 99 formed in the bottom of the mold section 88 and connected to the vacuum passage 83.

The bottom section 92 of each mold plate 75 has a set of longitudinally spaced holes 102 which connect a vacuum passage 104 extending from the vacuum passage 83 to a vacuum passage 106 under a cap plate 108. Thus the suction or partial vacuum within the manifold 70 creates a vacuum within the passages 83, 84, 86, 99, 104 and 106 and the holes 96 and 102 within each mold plate 75 as the mold plate and its supporting carrier slat 54 move along the stationary support plates 62.

Referring to FIG. 4, as the hot extruded sheet S progressively contacts the succession of mold plates 75 which move along the upper run of the endless conveyor 50 at a speed corresponding to the extrusion rate for the sheet S, the longitudinal center portion of the sheet is progressively sucked into the cavities 81 to form the shingle panels 12, and the lower and upper portions of the sheet S are progressively sucked into the undercut cavities defined by the bottom mold sections 92 and cap members 108 and onto the stepped surfaces 94 of the top sections 88 of the mold plates 75 to provide the sheet with a cross-sectional configuration as shown in FIG. 3.

After the sheet S is vacuum-formed within the mold plates 75 and is cooled as the sheet moves along the top run of the conveyor with the aid of air blowers and/or water streams directed against the moving carrier slats 54, the opposite edge portions 116 and 118 of the sheet are trimmed from the vacuum-formed sheet by cutting or slitting the sheet at the corners 121 and 122 (FIG. 3). The separated portions or trim of the edge portions 116 and 118 are directed into a suitable scrap chopper (not shown) for reducing the trim into fine particles which are conveyed back to the material supply hopper for the extruder.

After the trimming operation, the vacuum-formed sheet is reheated along a line or the step 124, and the outer stepped flange portion 118 of the sheet is progressively folded back onto the flange portion 18 to form the cross-sectional configuration for the upper edge portion of the panel, as shown in FIG. 2. The double wall nailing flange 24 is then progressively punched with the longitudinally spaced slots 31. As the vacuum-formed strip or sheet continues to move horizontally after the slots 31 are punched, the sheet is cut laterally at longitudinally spaced intervals, for example, intervals of 5 feet, for successively producing the siding panels 10 which are ready for installation.

Figure 6:
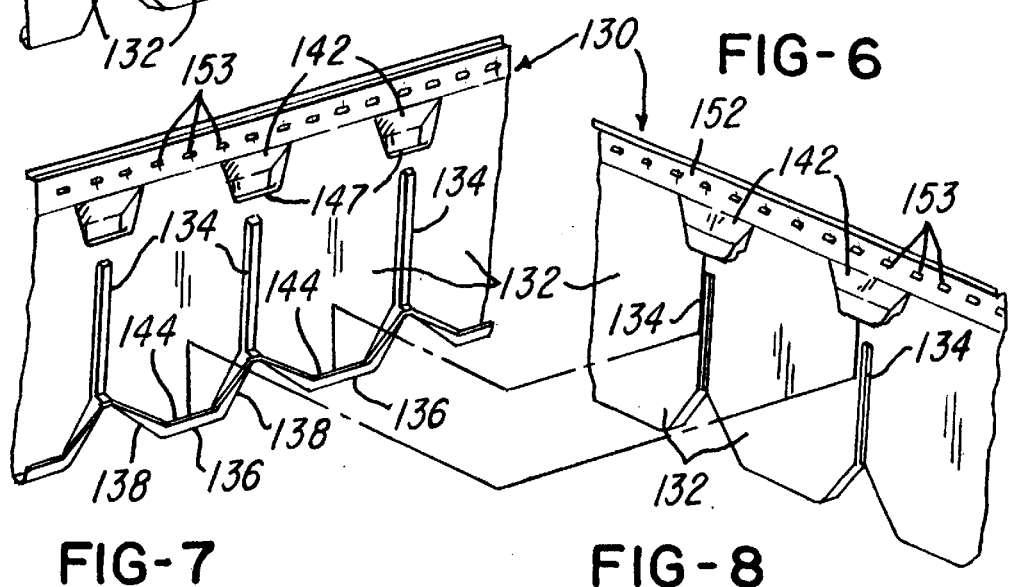
FIG. 6 is a perspective view of portions of the siding panels shown in FIG. 5 and illustrating the connection of adjacent overlapping panels.
Figure 7:
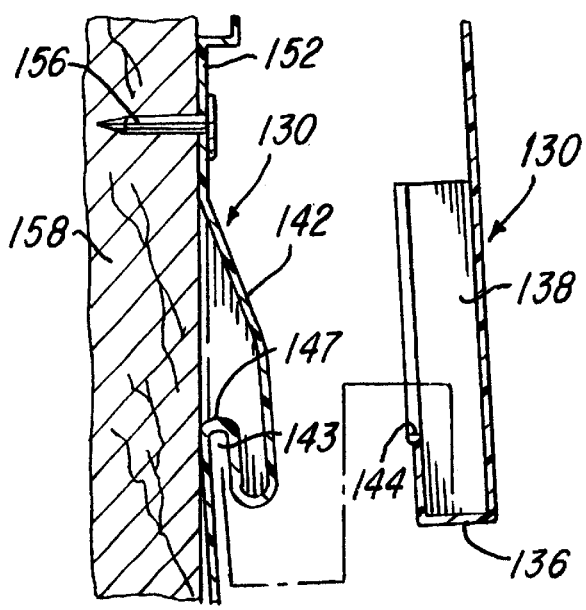
FIGS. 7 & 8 are fragmentary sections showing the assembly of the siding panels shown in FIGS. 5 & 6.
Figure 8:
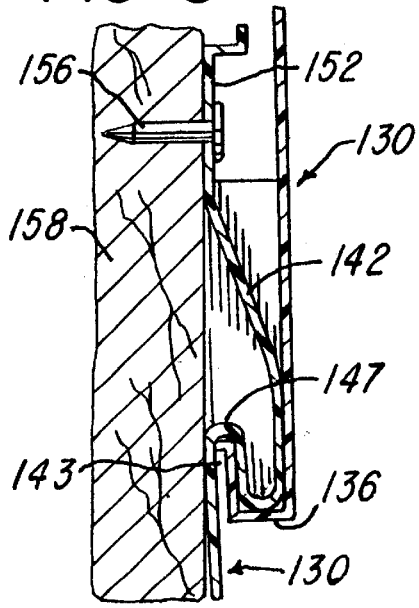

Referring to FIGS. 5–8, siding panels 130 are continuously produced by vacuum-forming endless conveyor apparatus in accordance with the invention, and each siding panel 130 includes a series of integrally connected shingle panels 132 separated by grooves formed by strip portions 134. Each shingle panel 132 has a wood grain pattern and a hook-shaped bottom portion 136 connecting tapering hook-shaped inclined portions 138 to provide each shingle panel 132 with generally a partial octagonal configuration. Each siding panel 130 also includes an upper portion having a series of longitudinally spaced and outwardly projecting tabs or projections 142 which are vertically aligned with the strip portions 134 and define corresponding undercut grooves 143 (FIG. 7) for receiving the hook-shaped bottom portions 136 of the shingle panels 132 of an overlapping siding panel 130. As shown in FIG. 6, the hook-shaped bottom portion 136 of each shingle panel 132 has a straight upper edge 144 and each projecting tab 142 has a straight horizontal edge 147 at the upper end of the corresponding groove 143. This provides for a positive and accurate connection of vertically adjacent overlapping siding panels 130, as shown in FIG. 8. The upper portion of each siding panel 130 also has a longitudinally extending continuous nailing flange 152 having longitudinally spaced slots 153 for receiving fasteners, such as the nails 156 (FIG. 8), for attaching each siding panel 132 to a vertical wall 158. At opposite ends of each panel 130, the projections 142 are half size, and a flange 159 projects from one end of each panel 130.

Figure 9:
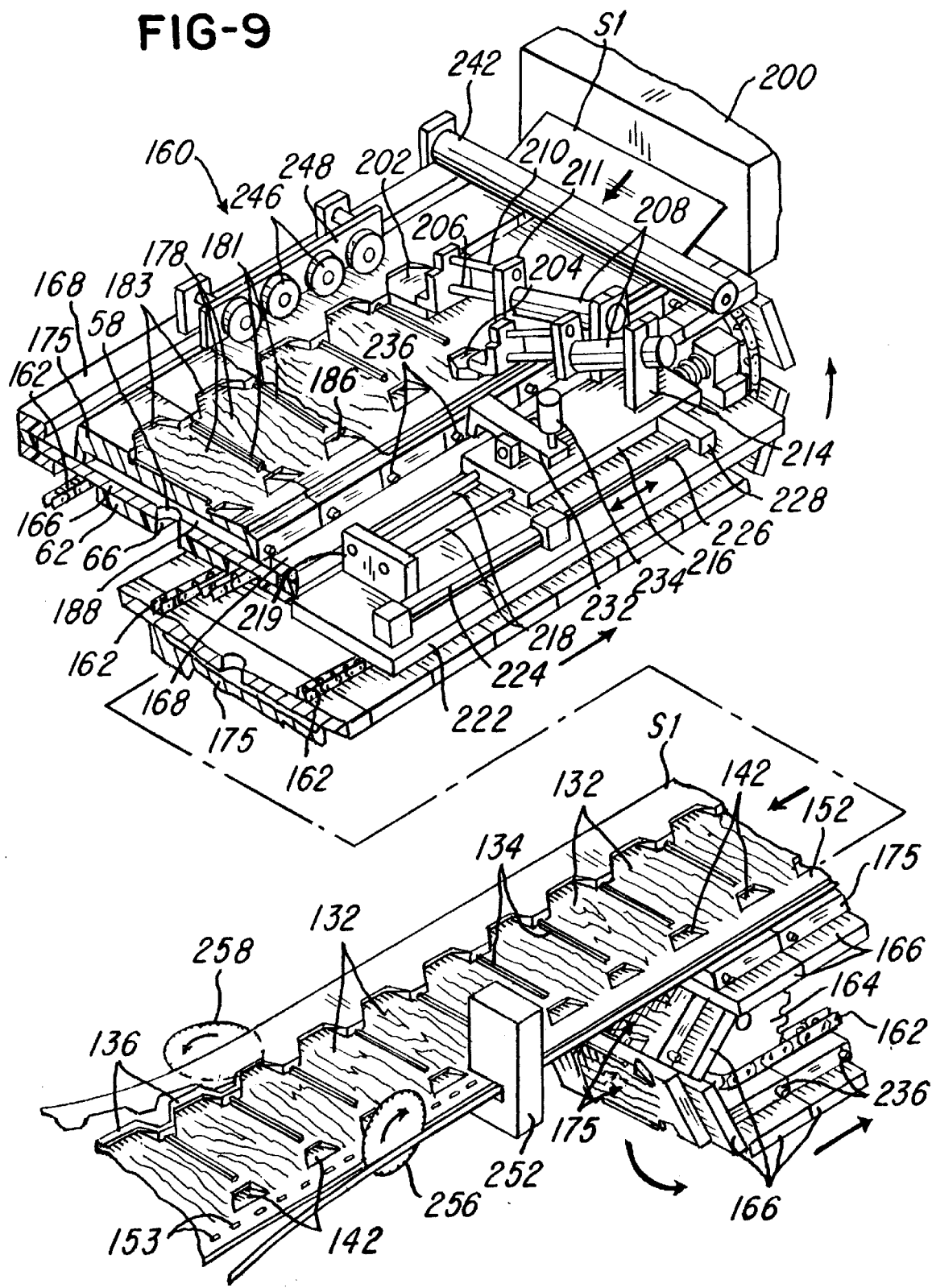
FIG. 9 is a fragmentary perspective view of vacuum-forming apparatus constructed in accordance with the invention for continuously forming the siding panels shown in FIGS. 5–8.
Figure 10:
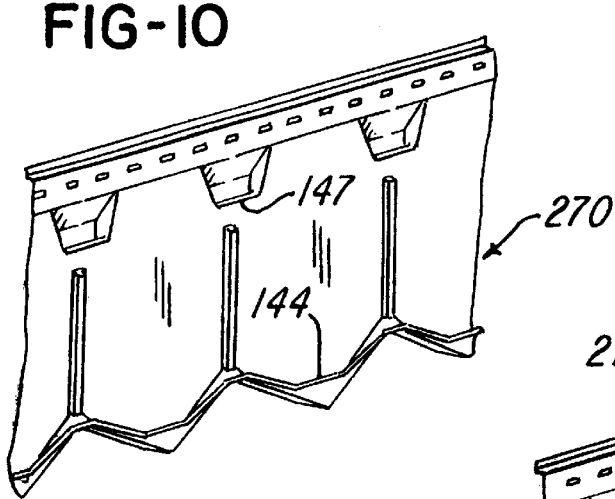
FIGS. 10–14 are fragmentary perspective views of different interchangeable siding panels produced with apparatus constructed as shown in FIG. 9.
Figure 11:
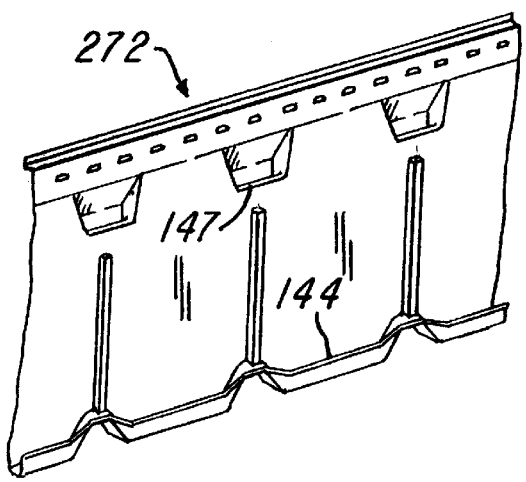
Figure 12:
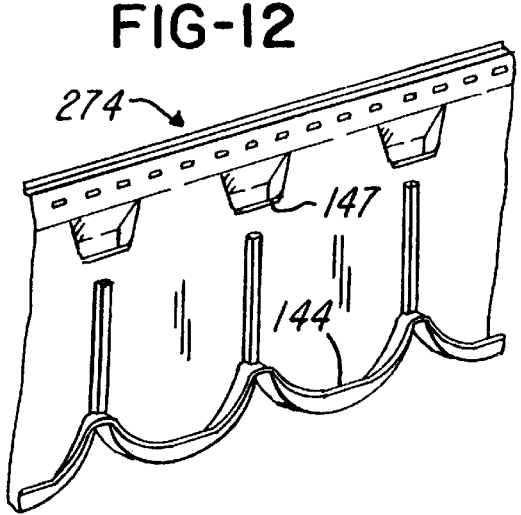
Figure 13:
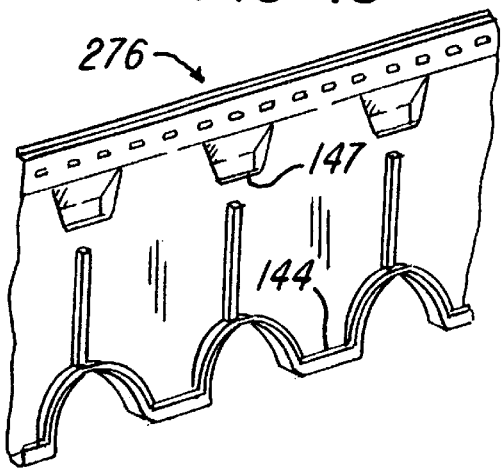
Figure 14:
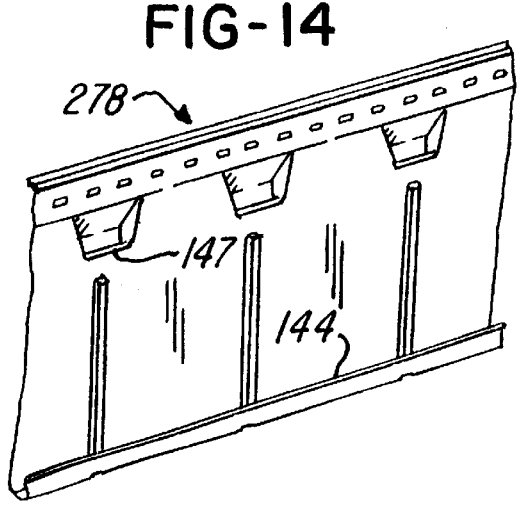

Referring to FIG. 9, a series of the siding panels 130 are continuously produced by a vacuum-forming endless conveyor machine or apparatus 160 which is generally constructed as described above in connection with FIG. 3 for continuously producing the siding panels 10. The machine 160 includes a pair of endless conveyor chains 162 which are constructed the same as the conveyor chains 52 and are directed about a corresponding set of sprockets 164 mounted on parallel spaced shafts (not shown) located at opposite ends of the machine 160. A series of rectangular aluminum slats 166 are constructed the same as the slats 54 and are attached to the conveyor chains 162, and the opposite end portions of the slats 166 are guided by an opposing set of parallel spaced guide tracks or rails 168 which are constructed the same as the guide rails 56 shown in FIG. 3. As also described above in connection with FIG. 3, the conveyor slats 166 are supported along the upper run of the conveyor by the support plate 62 having longitudinally spaced slots 66 which connect with the vacuum manifold 70. Each of the slats 166 has a center hole 58 which aligns with the slots 66 as the slats 166 slide horizontally on top of the support plate 62 for creating a continuous vacuum above each conveyor slat 166.

A series of aluminum mold plates 175 are attached to corresponding conveyor slats 166 in the same manner as the mold plates 75 are attached to the conveyor slats 54 described above in connection with FIG. 3. Each mold plate 175 has a shingle forming cavity 178 with the impression of a wood grain shingle and a border rib 181 which mates with the border rib 181 of the adjacent mold plate 175 to form the groove defining strip portions 134 between the shingle panels 132. Each of the mold plates 175 also has an undercut cavity 183 configured to form the bottom hook portions 136 and 138 of each shingle panel 132. As also shown in FIG. 9, each adjacent pair of abutting mold plates 175 cooperate to define another undercut cavity 186 which is configured to form the projecting tab 142 and undercut groove 143 in vertical alignment with each strip portion 134, as shown in FIG. 5. Each mold plate 175 has small vacuum passages (not shown) which connect the cavities 178, 183 and 186 to a vacuum cavity 188 formed within the bottom of each mold plate in the same manner and for the same purpose as the vacuum cavity or chamber 83 described above in connection with FIG. 3.

As shown in FIG. 9, a generally flat sheet S1 of thermoplastic material or PVC is continuously extruded from an extruder head 200 onto the mold plates 175 which form the upper linear run of the endless conveyor vacuum-forming machine 160, and the vacuum created within the cavities 178, 183 and 186 immediately sucks the hot sheet S1 into the cavities. As the hot sheet S1 is sucked into the vacuum mold plates 175, a set of vacuum-forming assist members or plugs 202 and 204 are quickly extended or inserted into the corresponding cavities 183 and 186 and then quickly retracted to assure that the plastic sheet S1 completely fills the cavities to form the portions 136 and 142 of each single panel 132. Each of the vacuum assist plugs 202 and 204 is supported for reciprocating movement on an incline by a corresponding piston rod 206 extending from a fluid or air cylinder 208 and by a corresponding guide rod 210 which reciprocates in a guide block 211 mounted on the outer end of the corresponding cylinder 208.

Each of the air cylinders 208 is supported by a corresponding plate or bracket 214 projecting upwardly from a carriage member or platform 216. The carriage platform 216 is supported for horizontal reciprocating movement by a pair of slides or guide rods 218 extending between a pair of support plates 219 mounted on a stationary support plate 222. A fluid or air cylinder 224 is also mounted on the plate 222 and has a piston rod 226 connected to an arm 228 projecting laterally from the carriage platform 216. An L-shaped locking or actuator arm or lever 232 is pivotally supported by the carriage platform 216 and is pivoted by a fluid or air cylinder 34. The locking or actuating lever 232 releasably and successively engages a series of actuating pins 236 projecting laterally or horizontally from the mold plates 175.

In operation of the endless conveyor vacuum-forming machine 160 for continuously producing the siding panels 130, the continuously extruded sheet S1 of PVC is directed under a guide roller 242 and onto the continuously moving mold plates 175 forming the upper run of the endless conveyor or machine 160. The speed of the conveyor machine is controlled to match the speed of the sheet S1, and the intermediate portion of the sheet is progressively sucked into the shingle cavities 178 and into the undercut cavities 183 and 186 of the mold plates. The vacuum assist plugs 202 and 204 are quickly and simultaneously extended by actuation of the cylinders 208 and press the portions of the hot sheet within the undercut cavities 183 and 186 further into the cavities. Thus the plugs assist the vacuum within the cavities for forming the undercut U-shaped portions 136 and 138 of the siding panels within the lower portion of the sheet and also form the projecting tabs 142 and the undercut grooves 143 within the upper portion of the sheet.

The plugs 202 and 204 travel with the vacuum-formed sheet S1 by movement of the carriage platform 216 in response to actuation of the air cylinder 234 to tilt the lever 232 for engaging a moving pin 236 on the conveyor. As soon as the vacuum assist plugs 202 and 204 are retracted, the tilting lever 218 disengages with the pin 236, and the carriage platform 216 returns to the right in FIG. 9 to its home position by the biasing force exerted by the air cylinder 224 to extend its piston rod 226. The timing of the actuation of the cylinders 208 and the cylinder 234 is controlled by electrically actuated valves (not shown) in time relation with the linear movement of the mold plates 175 on the endless conveyor chains 162.

As also shown in FIG. 9, as the intermediate portion of the sheet S1 is progressively vacuum formed into the mold plate cavities, the lower edge portion of the sheet is held against the top surfaces of the mold plates by a series of hold-down rollers 246 supported by a horizontally adjustable bar 248. After the continuously moving vacuum-formed sheet S1 is somewhat cooled on the conveyor mold plates 175 by conducting heat from the mold plates and is stripped from the mold plates, as shown in FIG. 9, the upper edge portion of the continuously moving vacuum-formed sheet is progressively punched by conventional punch and die machine 252 to form the longitudinally spaced slots 153, after which the upper portion of the sheet is trimmed by a rotating vertical saw blade 256. Simultaneously, the lower portion of the strip is trimmed by a horizontal circular saw blade 258 which is positioned to form the hook-shaped lower edge portions 136 and 138, thereby completing the continuous forming of the siding panels 130. Downstream of the saws 256 and 258, the continuous strip of integrally connected siding panels 130 is cut transversely at longitudinally spaced predetermined intervals, such as five feet, by a traveling reciprocating circular saw for successively producing the separate siding panels 130.

Referring to FIGS. 10–14, by interchanging the mold plates 175 on the conveyor slats 188, siding panels having shingle panels with different bottom contours or configurations and different wood grain patterns may be continuously produced on the vacuum-forming machine 160 in place of the siding panels 130. For example, a siding panel 270 (FIG. 10) having shingle panels with a partial hexagon bottom configuration, a siding panel 272 (FIG. 11) having shingle panels with mitered bottom corners, a siding panel 274 (FIG. 12) having shingle panels with a rounded bottom configuration, a siding panel 276 having shingle panels with a half cove bottom configuration or a siding panel 278 (FIG. 14) having shingle panels with a square bottom configuration may each be continuously produced on the apparatus or machine 160 simply by selecting the corresponding interchangeable mold plates 175. In each of the siding panels, the lower hook-shaped bottom portion of each shingle panel has a straight edge 144, and each projecting tab has a straight edge 147 defining an undercut groove, in the same location and with the same spacing therebetween as the straight edges 144 and 147 described above in connection with the siding panels 130. As a result, all of the siding panels 130, 270, 272, 274, 276 and 278 are interchangeable which permits various combinations of the siding panels to be attached to a vertical wall surface.

From the drawings and the above description, it is apparent that the continuous production of vacuum-formed siding panels in accordance with the invention, provides desirable features and advantages. For example, the continuous forming of the extruded flat sheet S or S1 with the continuous succession of mold plates 75 or 175 on the endless conveyor 50 or 160, provides for efficiently and economically producing the siding panels with different shingle panels each having sharp detail and one or more undercut portions. The close fitting aluminum mold plates along the upper run of the conveyor also efficiently and precisely form the lower and upper portions of each siding panel. The separate aluminum mold plates further provide the conveyor or machine with a long service life for producing a large volume of siding panels, and the mold plates may be rapidly cooled by cooling water or air during the continuous production of the siding panels. The vacuum-forming assist plugs 202 and 210 which travel with the sheet S1, also help in producing precision shingle panels with precision undercut portions.

While the methods and forms of apparatus and the siding panels herein described constitute preferred embodiments of the invention, it is to be understood that the invention is not limited to the precise methods and forms of apparatus and siding panels described, and that changes may be made therein without departing from the scope and spirit of the invention as defined in the appended claims. For example, it is within the scope of the invention to produce siding panels with a single elongated mold plate for each elongated siding panel and attach forward end portions of the mold plates to one pair of endless conveyor chains and the rearward end portions of the mold plates to another pair of endless conveyor chains so that the mold plates always remain horizontal as they travel with the endless conveyor chains.

What is claimed is:

1. A method of continuously producing a succession of elongated siding panels each having a series of longitudinally spaced and integrally connected separate shingle panels with a hook-shaped lower portion and an upper portion defining a mounting flange and a groove for receiving the lower portion of a vertically overlapping panel, the method comprising the steps of:

extruding a continuous sheet of heated plastics material with a generally uniform thickness and having longitudinal upper and lower portions integrally connected by a longitudinal intermediate portion, directing the sheet of heated material onto a series of rigid mold plates carried by an upper run of an endless conveyor and defining shingle cavities and undercut cavities, progressively vacuum-forming the sheet into the shingle cavities and undercut cavities of the mold plates by creating a vacuum within the cavities while the mold plates are moving on the upper run of the endless conveyor, successively inserting a traveling forming plug into the undercut cavities as the sheet is moving and being vacuum-formed into the undercut cavities for progressively forming a series of integrally connected siding panels, and cutting the sheet at longitudinally spaced intervals to produce the succession of separate elongated siding panels.

2. A method as defined in claim 1 wherein a lower portion of the sheet is progressively vacuum-formed into the undercut cavities within the mold plates and a corresponding traveling forming plug is successively inserted as the mold plates are moving on the upper run of the conveyor to form the hook-shaped lower portions of the shingle panels.

3. A method as defined in claim 2 wherein the upper portion of the sheet is progressively vacuum-formed into the undercut cavities within the mold plates and a corresponding traveling forming plug is successively inserted as the mold plates are moving on the upper run of the conveyor to form the grooves within the shingle panels.

4. A method as defined in claim 1 wherein the undercut cavities are formed within the upper and lower portions of the sheet, and all of the undercut cavities are formed with parallel straight edge engaging surfaces.

5. A method as defined in claim 4 wherein a variety of different shingle panels are formed with different shingle appearances, and the vertical distance between the straight edge engaging surfaces of each shingle panel is the same for all of the different shingle panels.

6. A method of continuously producing a succession of elongated siding panels each having a series of longitudinally spaced and integrally connected separate shingle panels with a hook-shaped lower portion and an upper portion defining a mounting flange and a groove for receiving the lower portion of a vertically overlapping panel, the method comprising the steps of:

extruding a continuous sheet of heated plastics material with a generally uniform thickness and having longitudinal upper and lower portions integrally connected by a longitudinal intermediate portion, directing the sheet of heated material onto an endless conveyor having molds defining shingle cavities and undercut cavities within the upper and lower portions of the molds, progressively vacuum-forming the sheet into the shingle cavities and undercut cavities of the molds by creating a vacuum within the cavities while the molds are moving on the upper run of the endless conveyor for progressively forming a series of integrally connected siding panels, forming all of the undercut cavities with parallel straight edge engaging surfaces, cutting the sheet at longitudinally spaced intervals to produce the succession of separate elongated siding panels, repeating the above steps with molds having different cavities for forming different shingle panels with different shingle appearances, and forming the vertical distance between the straight edge engaging surfaces of each shingle panel the same for all of the different shingle panels.

7. A method of continuously producing a succession of elongated siding panels each having a series of longitudinally spaced and integrally connected separate shingle panels with each shingle panel having a hook-shaped lower portion with a bottom edge wall and a folded-over upper flange portion forming a continuous double wall mounting flange above a continuous groove for receiving the hook-shaped lower portions of adjacent shingle panels, the method comprising the steps of:

extruding a continuous sheet of heated plastics material with a generally uniform thickness and having longitudinal upper and lower portions integrally connected by a longitudinal intermediate portion, directing the sheet of heated material onto a moving run of an endless conveyor having a continuous series of separate rigid mold plates defining cavities for receiving the upper portion, intermediate portion and lower portion of the sheet and with the cavities defining the bottom edge walls and stepped surfaces for the upper flange portions of the shingle panels, progressively sucking the upper portion, intermediate portion and lower portion of the sheet into the cavities of the mold plates with a vacuum applied to the mold plates as the plates are moving for progressively forming profiles of the integrally connected separate shingle panels including the upper flange portions and the bottom edge walls of the shingle panels, progressively cooling the integrally connected shingle panels while the shingle panels remain on the moving mold plates, progressively reheating a longitudinal section of the upper portion of the sheet adjacent the upper flange portions, progressively folding over the upper flange portions of the shingle panels at the reheated section to form the continuous double wall mounting flange and continuous groove, and cutting the sheet at longitudinally spaced intervals to produce the succession of the elongated siding panels.

8. A method as defined in claim 7 and including the steps of:

forming each mold plate with a first end portion having an upwardly projective surface defining the bottom edge wall for the corresponding and shingle panel, forming each mold plate with a second end portion having the stepped surface defining the upper flange portion for the corresponding shingle panel, and forming each mold plate with an intermediate portion defining a rough shingle surface for the corresponding shingle panel.

9. A method as defined in claim 8 and including the step of:

forming each of the mold plates of aluminum to facilitate rapid cooling of the shingle panels while the shingle panels remain on the mold plates.

* * * * *